United States Patent
Geyer et al.

(10) Patent No.: US 7,398,773 B2
(45) Date of Patent: Jul. 15, 2008

(54) EGR RECOVERY SYSTEM AND METHOD

(75) Inventors: Stephen Geyer, State Line, PA (US);
Gregory J. Birky, Boonsboro, MD (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 10/578,436

(22) PCT Filed: Nov. 12, 2004

(86) PCT No.: PCT/US2004/037730

§ 371 (c)(1),
(2), (4) Date: Feb. 21, 2007

(87) PCT Pub. No.: WO2005/047685

PCT Pub. Date: May 26, 2005

(65) Prior Publication Data

US 2007/0240691 A1 Oct. 18, 2007

Related U.S. Application Data

(60) Provisional application No. 60/518,648, filed on Nov. 12, 2003.

(51) Int. Cl.
*F02M 25/07* (2006.01)
*F02B 47/08* (2006.01)
*F02B 33/44* (2006.01)

(52) U.S. Cl. .................. 123/568.21; 701/108; 60/605.2

(58) Field of Classification Search ............ 123/568.21, 123/568.23, 568.24, 568.11, 568.12, 568.14, 123/568.27, 435, 676, 559.1; 701/108; 60/605.2; 73/118.1, 117.3
See application file for complete search history.

(56) References Cited

U.S. PATENT DOCUMENTS

| 4,147,143 | A |   | 4/1979 | Harada |
|---|---|---|---|---|
| 4,349,004 | A |   | 9/1982 | Matsuda |
| 4,602,606 | A |   | 7/1986 | Kawagoe et al. |
| 4,723,527 | A |   | 2/1988 | Panten et al. |
| 5,533,489 | A |   | 7/1996 | Socci et al. |
| 5,921,223 | A |   | 7/1999 | Fukuma |
| 6,035,639 | A | * | 3/2000 | Kolmanovsky et al. .... 60/605.2 |
| 6,263,672 | B1 |   | 7/2001 | Roby et al. |
| 6,298,835 | B1 | * | 10/2001 | Horie et al. ............ 123/568.21 |

(Continued)

FOREIGN PATENT DOCUMENTS

JP    11-294265    10/1999

*Primary Examiner*—Willis R. Wolfe, Jr.
*Assistant Examiner*—Johnny H. Hoang
(74) *Attorney, Agent, or Firm*—Martin Farrell

(57) ABSTRACT

An EGR recovery system and method includes calculating a transient volume of EGR sufficient to maintain NOx emitted by an engine below a predetermined level during a period of transient operation of said engine, supplying an actual volume of EGR during said period of transient operation, measuring said actual level of EGR during said period of transient operation, calculating an EGR deficit between said transient volume of EGR and said actual of volume of EGR during said period of transient operation, integrating said EGR deficit over said period of transient operation to calculate a deficit volume of EGR, calculating a following steady-state volume of EGR sufficient to maintain NOx emitted by said engine of said engine below said predetermined level during a following period of substantially steady-state operation of said engine, and supplying said following steady-state volume of EGR plus said deficit volume of EGR during said following period of substantially steady-state operation of said engine.

17 Claims, 2 Drawing Sheets

U.S. PATENT DOCUMENTS

| | | |
|---|---|---|
| 6,301,888 B1 | 10/2001 | Gray, Jr. |
| 6,502,563 B2 | 1/2003 | Itoyama |
| 6,698,409 B1 | 3/2004 | Kennedy et al. |
| 6,725,829 B2 | 4/2004 | Kataoka et al. |
| 6,729,303 B2 * | 5/2004 | Itoyama et al. ............. 123/478 |
| 6,820,599 B2 | 11/2004 | Kurtz et al. |
| 6,879,904 B2 * | 4/2005 | Muto et al. ................ 701/108 |
| 6,973,382 B2 * | 12/2005 | Rodriguez et al. .......... 701/108 |
| 7,143,753 B2 * | 12/2006 | Tanaka et al. .......... 123/568.14 |
| 7,195,007 B2 * | 3/2007 | Muto et al. ............ 123/568.22 |
| 7,281,518 B1 * | 10/2007 | Allain et al. ................ 123/434 |
| 2001/0045210 A1 | 11/2001 | Itoyama |
| 2002/0139361 A1 | 10/2002 | Itoyama et al. |
| 2002/0179068 A1 | 12/2002 | Mueller |

* cited by examiner

EGR RECOVERY SYSTEM AND METHOD

CROSS-REFERENCE TO RELATED APPLICATIONS

This application is a National Phase of International Application Ser. No. PCT/US2004/037730, filed 12 Nov. 2004, which claims benefit of U.S. Provisional Application Ser. No. 60/518,648, filed 12 Nov. 2003.

BACKGROUND OF THE INVENTION

1. Field of the Invention

This invention relates to the field of exhaust gas recirculation (EGR) recovery.

2. Description of the Related Art

There are competing controls at work with an exhaust gas recirculation (EGR) equipped engine. One is trying to keep the brake specific oxides of nitrogen (BSNOx) levels at the emission standard while the other is trying to maintain a drivable vehicle. EGR may be provided to an intake air charge to damp combustion temperatures, thus reducing the amount of BSNOx that is being produced. EGR, however, replaces some of the air in the intake charge, promoting smoke generation if the air-to-fuel ratio falls too far. Large amounts of smoke can occur with EGR application when the driver wants to quickly accelerate the vehicle. Under these conditions EGR flow may be suspended briefly while fuel is added and the turbocharger is used to accelerate the vehicle. Higher levels of BSNOx emissions, however, are produced while the EGR flow is suspended.

The BSNOx emission standard is based on a 20 minute driving cycle and contains numerous quick accelerations. The overall engine calibration may be lowered in order to make up for the higher level of BSNOx produced during rapid accelerations. Lowering the engine calibration continuously to make up for brief periods of higher BSNOx, however, hurts the steady state fuel economy.

SUMMARY OF THE INVENTION

A primary object of the invention is to overcome the deficiencies of the related art described above by providing an EGR recovery system and method. The present invention achieves these objects and others by providing an EGR recovery system and method.

In several aspects, the invention may provide an EGR recovery system and method. In particular, in a first aspect, a method of EGR recovery may comprise the steps of calculating a transient volume of EGR sufficient to maintain NOx emitted by an engine below a predetermined level during a period of transient operation of said engine, supplying an actual volume of EGR during said period of transient operation, measuring said actual level of EGR during said period of transient operation, calculating an EGR deficit between said transient volume of EGR and said actual volume of EGR during said period of transient operation, integrating said EGR deficit over said period of transient operation to calculate a deficit volume of EGR, calculating a following steady-state volume of EGR sufficient to maintain NOx emitted by said engine of said engine below said predetermined level during a following period of substantially steady-state operation of said engine, and supplying said following steady-state volume of EGR plus said deficit volume of EGR during said following period of substantially steady-state operation of said engine.

In a second aspect, a system for EGR recovery may comprise means for calculating a transient volume of EGR sufficient to maintain NOx emitted by an engine below a predetermined level during a period of transient operation of said engine, means for supplying an actual volume of EGR during said period of transient operation, means for measuring said actual level of EGR during said period of transient operation, means for calculating an EGR deficit between said transient volume of EGR and said actual volume of EGR during said period of transient operation, means for integrating said EGR deficit over said period of transient operation to calculate a deficit volume of EGR, means for calculating a following steady-state volume of EGR sufficient to maintain NOx emitted by said engine of said engine below said predetermined level during a following period of substantially steady-state operation of said engine, and means for supplying said following steady-state volume of EGR plus said deficit volume of EGR during said following period of substantially steady-state operation of said engine.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
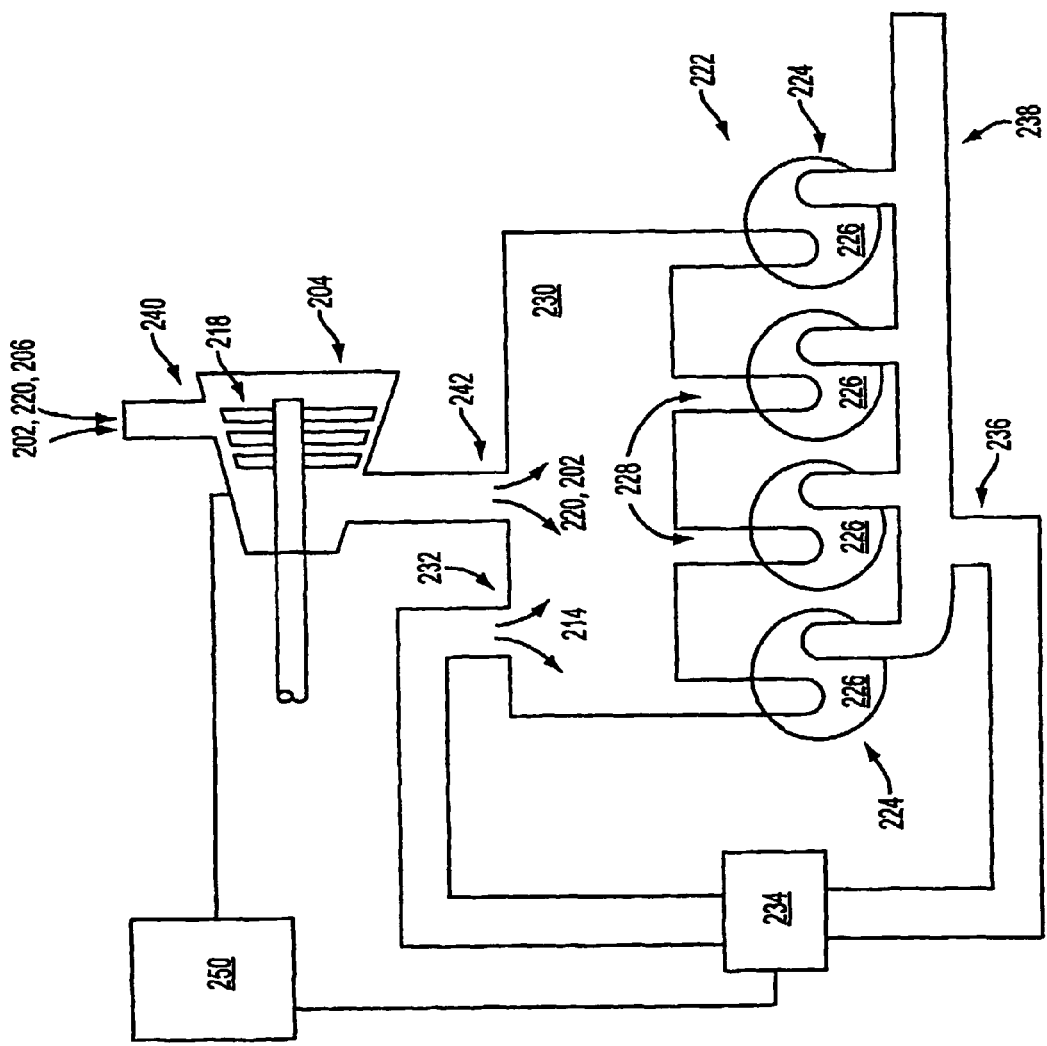
FIG. 1 is a schematic diagram of a turbo-charged internal combustion engine for use with an embodiment of the invention.

In FIG. 1 is shown a schematic diagram of a turbo-charged internal combustion engine 222 for use with an embodiment of the invention. Turbo-charged internal combustion engine 222 may include a plurality of cylinders 224, each having a combustion chamber 226 fed by a runner 228 of an intake manifold 230. A compressor 204 may provide pressurized intake air 202 to intake manifold 230. Compressor 204 may have an inlet 240 receiving low pressure air 202, which may be at ambient pressure, and an outlet 242 plumbed to intake manifold 230. Also plumbed to intake manifold 230 may be an outlet 232 of an exhaust gas recirculation (EGR) valve 234. An inlet 236 of EGR valve 234 may scavenge exhaust gases from an exhaust manifold 238 also connected to combustion chambers 226.

Since lowering the engine calibration continuously to make up for brief periods of higher brake specific oxides of nitrogen (BSNOx) may hurt the steady state fuel economy, it would be desirable if the engine calibration could be raised. It would further be desirable if, rather than lowering the overall engine calibration in order to make up for the higher level of BSNOx produced during rapid accelerations, the amount of EGR flow lost during the brief suspended periods of no EGR could be made up when EGR was resumed.

Periods of EGR valve 234 closures that are not related to vehicle accelerations such as engine braking or light load operation may be ignored. Otherwise, the amount of EGR lost during periods of EGR valve 234 closures may be completely recovered by flowing additional EGR during steady state operation as long as the engine 222 is in a condition to support additional EGR flow. Thus the overall engine calibration can remain at a higher BSNOx level without compromising fuel economy. Fuel economy is made worse only while the EGR flow is being recovered.

In particular, the difference between the desired EGR gas flow from the output of the exhaust gas demand module (EGDM) and the actual EGR flow evaluated from the gas flow measurement may be used to calculate a deficit. The deficit may be translated into a unitless parameter, which is summed up over time (integration). The integration may be frozen (stopped) for any combination of exhaust gas on/off (EGOO) control bits via a bit mask. The features of the EGR on/off may be reflected in any combination into the exhaust gas recirculation recovery (EGRR).

In addition, the EGRR may have a load threshold for freezing the integrator. The integrator value may be used to calculate the flow rate of EGR to be added to the normally calculated desired amount of EGR flow. This may be done over a programmable period of time. A higher flow rate for a shorter time period or a lower flow rate for a longer time period may be used. The longer time period may result in poorer fuel economy for a long time period. A short time period may result in more smoke during the recovery period.

The recovery time period for best fuel economy may be balanced against acceptable smoke and particulate emissions. The EGR recovery rate may ultimately be capped by the smoke limiter. If the EGR recovery places the air-to-fuel ratio too close to the smoke limit air-to-fuel ratio, the EGR recovery rate may be reduced to prevent smoke, extending the recovery time. If there is a poor operating range in the speed range of the engine, a multiplier may be set to reduce the additional input of EGR. The goal is to use the full amount of EGR flow from the recovery calculation. Operating conditions such as high altitude may limit the amount of recovery possible as well.

Figure 2:
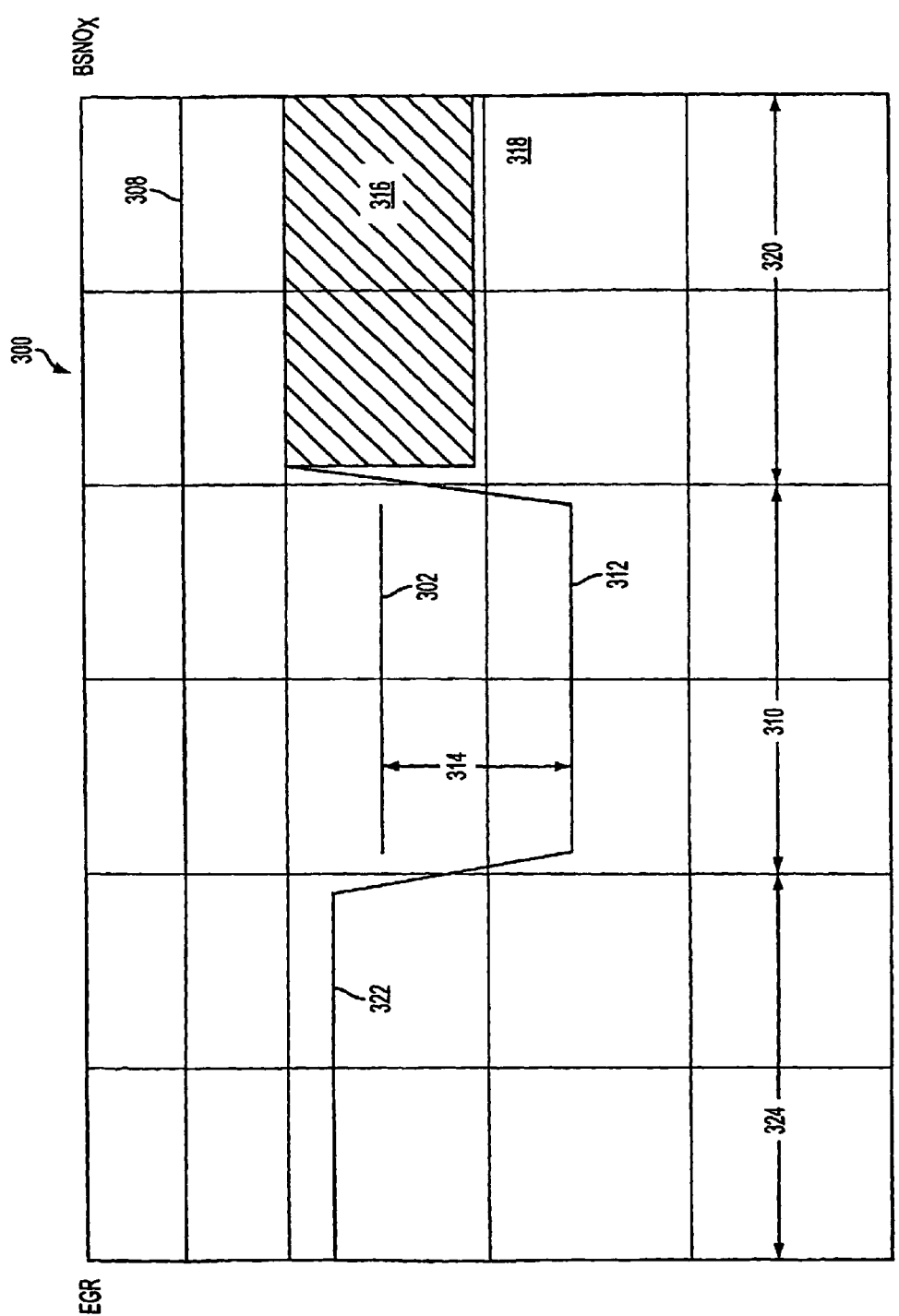
FIG. 2 is an EGR schedule according to a first embodiment of the invention.

In particular, as shown graphically in FIG. 2, in a first embodiment a method of EGR recovery 300 may comprise the steps of calculating a transient volume of EGR 302 sufficient to maintain NOx emitted by an engine 222 below a predetermined level 308 during a period of transient operation 310 of engine 222, supplying an actual volume of EGR 312 during period of transient operation 310, measuring actual volume of EGR 312 during period of transient operation 310, calculating an EGR deficit 314 between transient volume of EGR 302 and actual volume of EGR 312 during period of transient operation 310, integrating EGR deficit 314 over period of transient operation 310 to calculate a deficit volume of EGR 316, calculating a following steady-state volume of EGR 318 sufficient to maintain NOx emitted by engine 222 of engine 222 below predetermined level 308 during a following period of substantially steady-state operation 320 of engine 222, supplying following steady-state volume of EGR 318 plus deficit volume of EGR 316 during following period of substantially steady-state operation 320 of engine 222.

In one embodiment, method of EGR recovery 300 may also include calculating a leading steady-state volume of EGR 322 sufficient to maintain NOx emitted by an engine 222 below predetermined level 308 during a leading period of substantially steady-state operation 324 of engine 222, supplying leading steady-state volume of EGR 322 during leading period of substantially steady-state operation 324 of engine 222.

In one embodiment, method of EGR recovery 300 may also include reducing actual volume of EGR 312 during period of transient operation 310. In one embodiment, method of EGR recovery 300 may also include normalizing EGR deficit 314 to produce a unitless parameter. In one embodiment, method of EGR recovery 300 may also include freezing integration of EGR deficit 314 over period of transient operation 310 via a bit mask. In one embodiment, method of EGR recovery 300 may also include freezing integration of EGR deficit 314 over period of transient operation 310 at a load threshold. In one embodiment, method of EGR recovery 300 may also include adjusting a duration 326 of following period of substantially steady-state operation 320 of engine 222. In one embodiment, method of EGR recovery 300 may also include reducing deficit volume of EGR 316 supplied during following period of substantially steady-state operation 320 of engine 222 if an air-to-fuel ratio 328 approaches a smoke limit air-to-fuel ratio 130. In several embodiments, period of transient operation 310 may occur during acceleration, deceleration, braking, engine braking, or lugging.

EXAMPLE I

An example of an EGR recovery program for use with an embodiment of the invention is attached.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

EXAMPLE 1
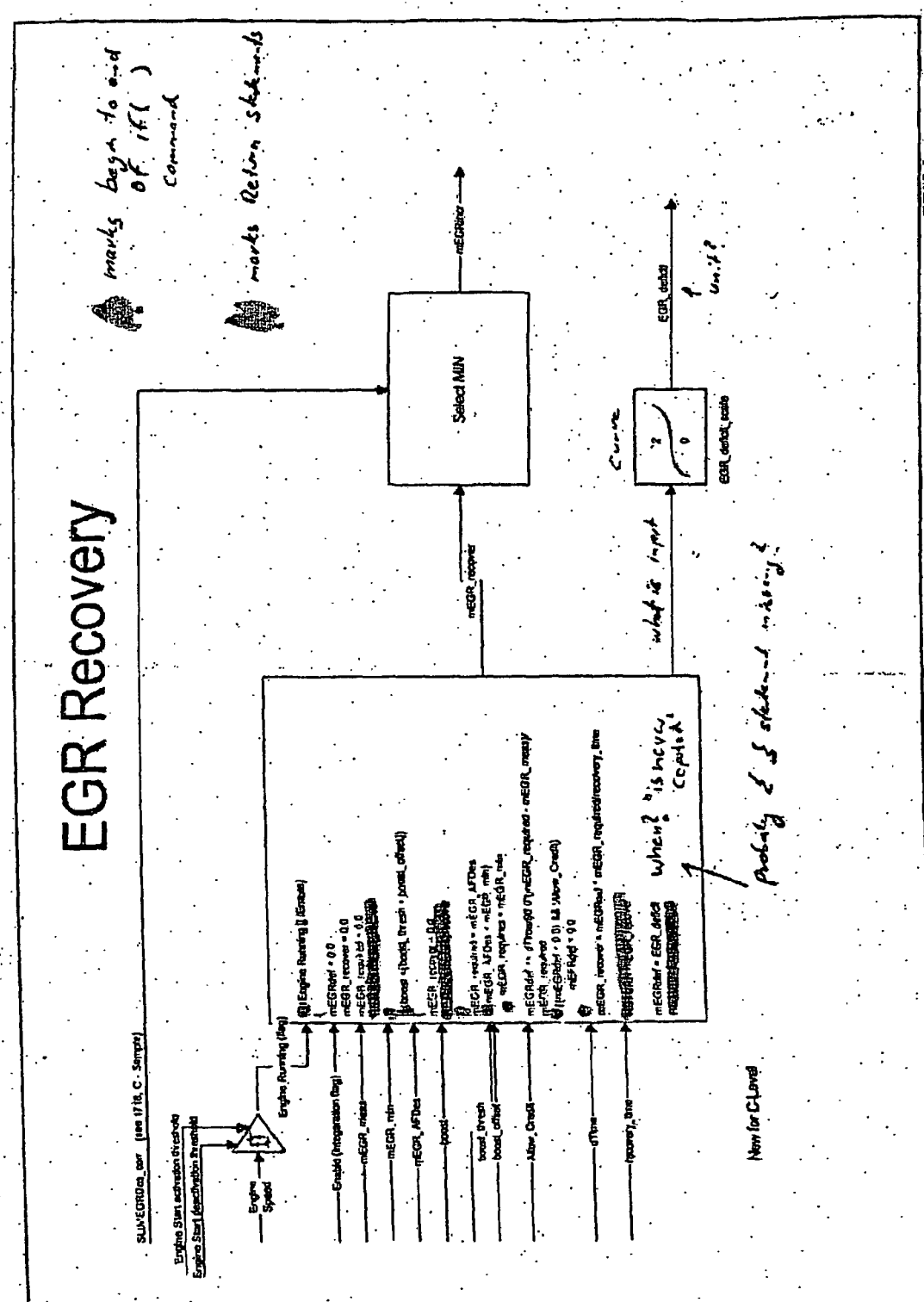

6.8 EGR Recovery (EGRR)

6.8.1 Brief Description

The EGR Recovery is a function which calculates the differences between EGR gas flow desired (output from egdm) and the EGR gas flow measured "or evaluated by Gas Flow Model" (egfm). This difference, called deficit is translated to the time egrr_dt_egrdef_l, which is added up into a buffer (integrator). The indication of this integrator shows the transient (static) behaviour of the EGR gas flow over time. From these value is build the egrr_dm_recover_w and a like (derp) percent proportional factor egrr_r_deficit_w.

6.8.2 EGR Recovery Overview Conditions

This function needs several conditions fulfilled for a proper work.

6.8.2.1 The EGRR Enable Flag (egrr_s_enable_b)

To get the EGR recovery function running this flag must be set. It can be enabled by setting EGRR_S_ENABLE_B = TRUE and the engine running condition (egrr_s_running_b) is true. In case of an disabled egrr (egrr_s_enable_b = FALSE) the internal integrator egrr_dt_integrator_l will be set to the initialisation value EGRR_DT_INIT_CL. All outputs will follow to appropriate values.

NOTE: If the initialisation value is not zero, the output egrr_dm_roover_w will follow to an egrr_dm_required_w depend value (if there is nor freeze condition active)!

6.8.2.2 The integrator freeze conditions

In case of at least one active flag egrr_s_illegal_b, egrr_s_boost_w or egrr_s_egoo_b the egrr_dt_integrator_l is hold on last valid value, the egrr_dm_required_w is set to zero and also egrr_dm_recover_w follows to zero.

The Illegal Flag (egrr_s_illegal_b)

This is a security function to prevent a (application dependent) division by zero. This Flag is set (egrr_s_illegal_b = TRUE) if the maximum selection's output becomes zero.

The Boost Flag (egrr_s_boost_b)

This flag is set if the boost etips_p_w is below the threshold, calculated in egdm_p_boostthersh_w (with an offset EGRR_P_THROFSET_CW). To prevent toggling states for values close to the threshold the hysterese EGRR_P_HYST_CW is added.

The Egoo Flag (egrr_s_egoo_b)

This flag is set if the bit wise negated egoo_s_case_uw (egrr_s_egoocase_uw) fits to the mask EGRR_S_EGOOMASK_CUW. The condition can be chosen either as bit wise AND (EGRR_S_ANDOR_EGOO_CB = 1) or as an simple OR with (EGRR_S_ANDOR_EGOO_CB = 0). To prevent toggling conditions there is integrated a Timer EGRR_DT_EGOO_CUC (egrr_dt_egoo_uc) for switch on (egrr_s_egoo_b => TRUE) delay. This Timer can be disabled with setting to 0xff.

6.8.3 EGR Recovery Calculations

The function calculates the difference between egfm_dm_egrout_w and egdm_dm_maxegfrm_w (limited to EGRR_DM_MIN_CW) From this difference the fraction is build as follow:

egrr_dm_required_w = max(egdm_dm_des_w, EGDM_DM_MIN_CW)

$$egrr\_r\_egrdef\_w = \frac{egrr\_dm\_required\_w - egfm\_dm\_egrout\_w}{egrr\_dm\_required\_w}$$

This value (egrr_r_egr_def_w) is provided with the sample time (egr_dt_sample_w (to egrr_dt_egrdef_w) and finally added to the integrator buffer egrr_dt_integrator_l. The indication of the integrator egrr_dt_integrator_l is translated to egrr_dt_integrator_w (10ms/bit). This is the base for all following calculations. The egrr_dt_integrator_l is limited to EGRR_DT_MAXEGR_CL and EGRR_DT_MINEGR_CL.

6.8.4 EGR Recover deficit (egrr_r_deficit_w)

This value is calculated by means of the curve EGRR_R_DEFICIT_CUR depend on egrr_dt_integrator_w.

6.8.5 EGR Recover (egrr_dm_recover_w)

The egrr_dm_recover_w is calculated depend on egrr_dt_integrator_w, egrr_dm_required_w and EGRR_DT_RECOVERY_CW, by formula.

$$6.8.6 \quad egrr\_dm\_recover\_w = \frac{egrr\_dt\_integrator\_w * egrr\_dm\_required\_w}{EGRR\_DT\_RECOVERY\_CW}$$

6.8.7 EGR Recover (egrr_dm_recover_w)

This value is the minimum between egrr_dm_recover_w and silm_dm_egrdescor_w (scaled through the means of EGRR_SF_EXTIN_CUR, depend on engine speed)

6.8.8 EGRR Remote Control

There is an remote control for the egrr_r_deficit_w available. If the appropriate flag in rmtc_d_sw_sepo_uf is set, the output egrr_r_deficit_w will follow the value on rmtc_r_egrr_w. The value egrr_dm_recover_w will follow this proportional control due to the means of the 'invers' curve EGRR_DT_INVERS_CUR.

NOTE:
The value egrr_dm_recover_w is still depend on egrr_dm_required_w and EGRR_DT_RECOVER_W_l
This "inverse remote control" will work only for positive values. The integrator can't be set to negative values with remote control (exception if the grading in EGRR_R_DEFICIT_CUR also changes). If this function should be disabled, please set all values in EGRR_DT_INVERS_CUR to zero (the output will follow).

6.8.8.1 Flags in Case of Remote Control

- egrr_s_enable_b is set to TRUE
- egrr_s_boost_b is set to FALSE
- egrr_s_running_b is set to FALSE
- egrr_s_illegal_b is set to FALSE
- egrr_s_egco_b is set to FALSE

INPUT VARIABLES:

| | |
|---|---|
| eess_n_avg_w | engine speed |
| slim_dm_descor_w | calculated flow from slim |
| fegr_dt_sample_w | egr system sample time in very high resolution |
| egfm_dm_egrout_w | calculated (evaluated) egr flow |
| egdm_dm_maxegrlim_w | desired EGR Mass Flow after maximum limitation to EGDM_DM_MAXLIMIT_CW |
| ebps_p_w | boost pressure |
| egdm_p_boostthresh_w | boost threshold calculated in egdm |
| strt_s_uc | engine start flag |
| mtc_r_egrr_w | remote control replacement value |
| mtc_d_sw_sepo_ul | remote control set point bit mask |
| egoo_s_case_uw | EGR on off controller reason |

INTERNAL VARIABLES:

| | |
|---|---|
| egrr_dt_egrdef_l | ratio with sample time |
| egrr_dt_defunlim_l | ratio with sample plus integrator value |
| egrr_dt_integrator_l | ratio stored in integrator |
| egrr_dm_required_w | copy of egdm or limited input |
| egrr_dm_external_w | corrected-input from external input (slim) |
| egrr_dm_deficit_w | deficit after subtraction desired - actual flow |
| egrr_dt_integrator_w | ratio stored in integrator re-scaled to short (10 ms/bit) |
| egR_r_egrdef_w | nameless value, result from division |
| egrr_sf_external_w | scaling factor from curve calculation |
| egrr_s_egoocase_uw | bit wise negated egoo_s_case_uw |
| egrr_dt_egoo_uc | delay timer for egrr_s_egoo_b activation |
| egrr_s_running_b | engine running flag |
| egrr_s_boost_b | switch off condition boost below threshold |
| egrr_s_egoo_b | switch off condition EGOO controller with mask |
| egrr_s_illegal_b | set in case of division by zero (egrr_dm_required = 0) |

OUTPUT VARIABLES:

| | |
|---|---|
| egrr_dm_recover_w | recovery egr mass flow |
| egrr_r_deficit_w | egr recovery depend proportional factor |
| egrr_dm_egrincr_w | minimum of egrr_dm_recover_w or slim_dm_egrdescor_w (scaled) |
| egrr_s_enable_b | enable flag for egrr function |

DATA:

| | |
|---|---|
| EGRR_DT_MAXEGR_CL | maximum limit for integrator |
| EGRR_DT_MINEGR_CL | minimum limit for integrator |
| EGRR_DT_INIT_CL | init value for integrator |
| EGRR_DT_EGOO_CUC | delay timer for switch in egoo condition |
| EGRR_DM_MIN_CW | minimum input limit for input egdm_dm |
| EGRR_DT_RECOVERY_CW | recovery time |
| EGRR_P_THROFFSET_CW | offset to boost pressure (egdm_p_boost..) |
| EGRR_P_HYST_CW | debouncing hysteresis |
| EGRR_S_ENABLE_CB | enable EGR Recovery flag |
| EGRR_S_EGOOMASK_CUW | EGOO Bit mask for freeze the Integrator |
| EGRR_S_ANDOR_EGOO_CB | switch to choose between "AND" and "OR" mask condition for egoo integrator freeze condition |
| EGRR_R_DEFICIT_CUR | translation curve from EGR Recovery (dm) to value like derp_r_w |
| EGRR_DT_INVERS_CUR | inverse curve for remote control use |

EGRR_SF_EXTIN_CUR    scaling for external dm in (SLIM)

LOCAL #DEFINES;

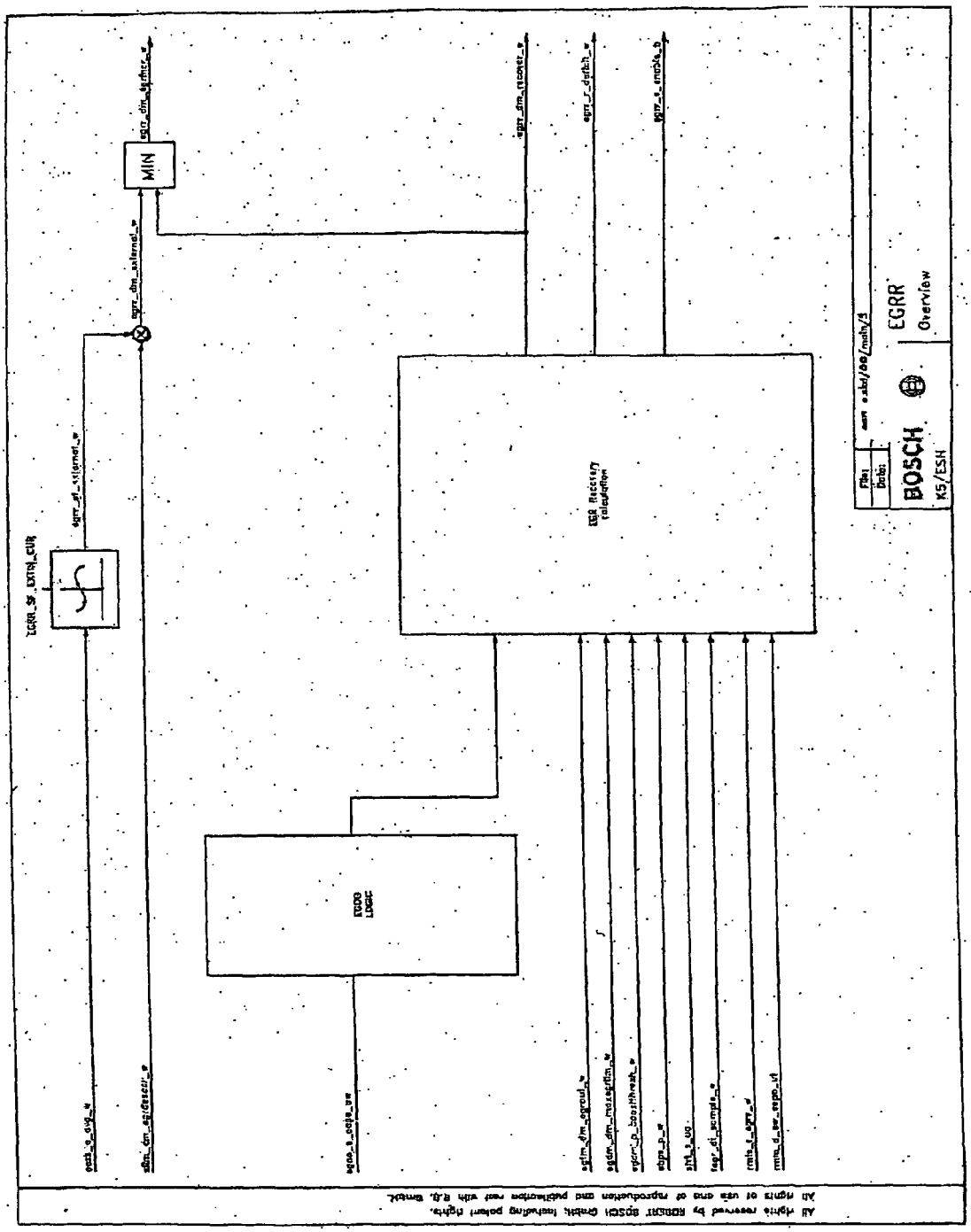

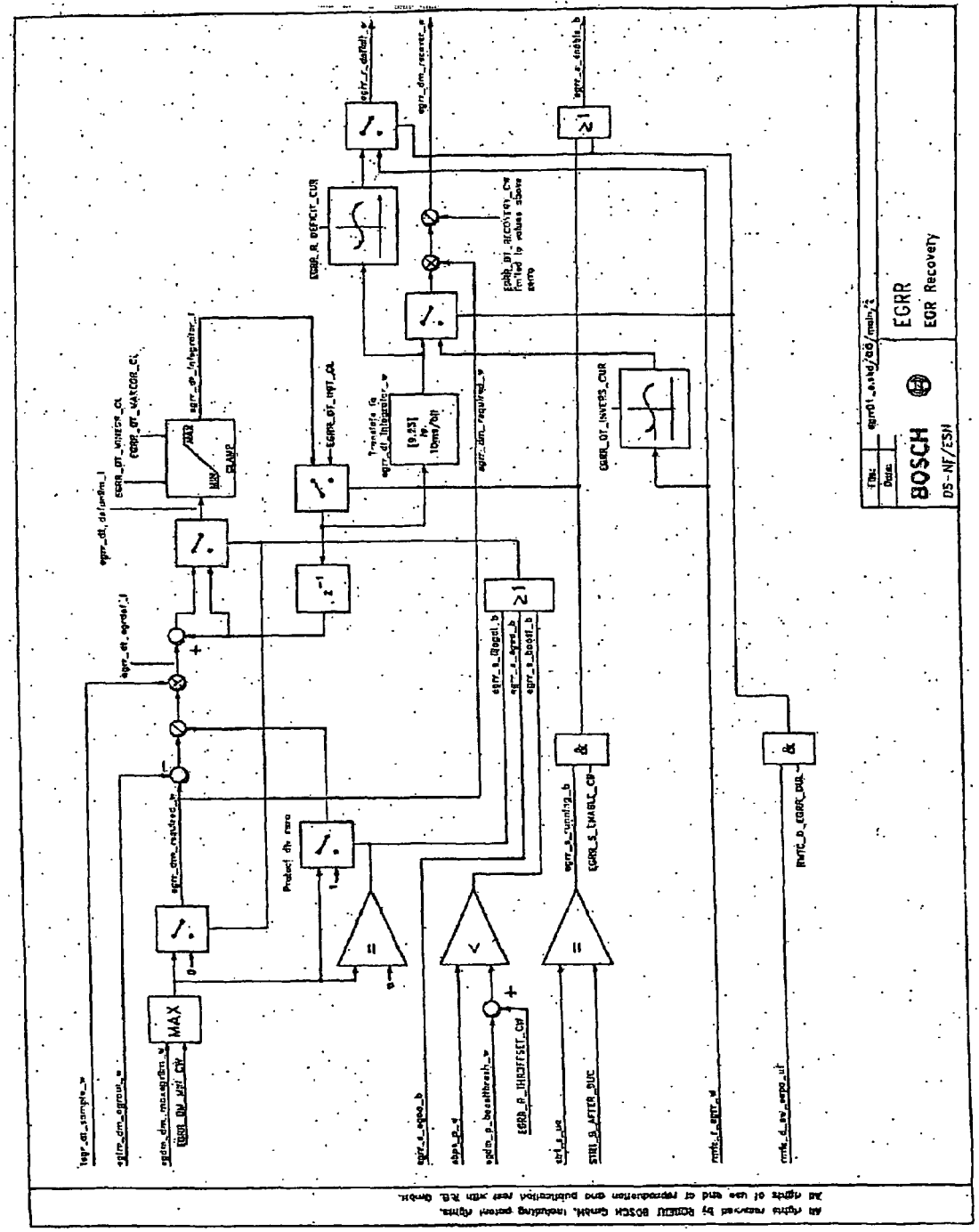

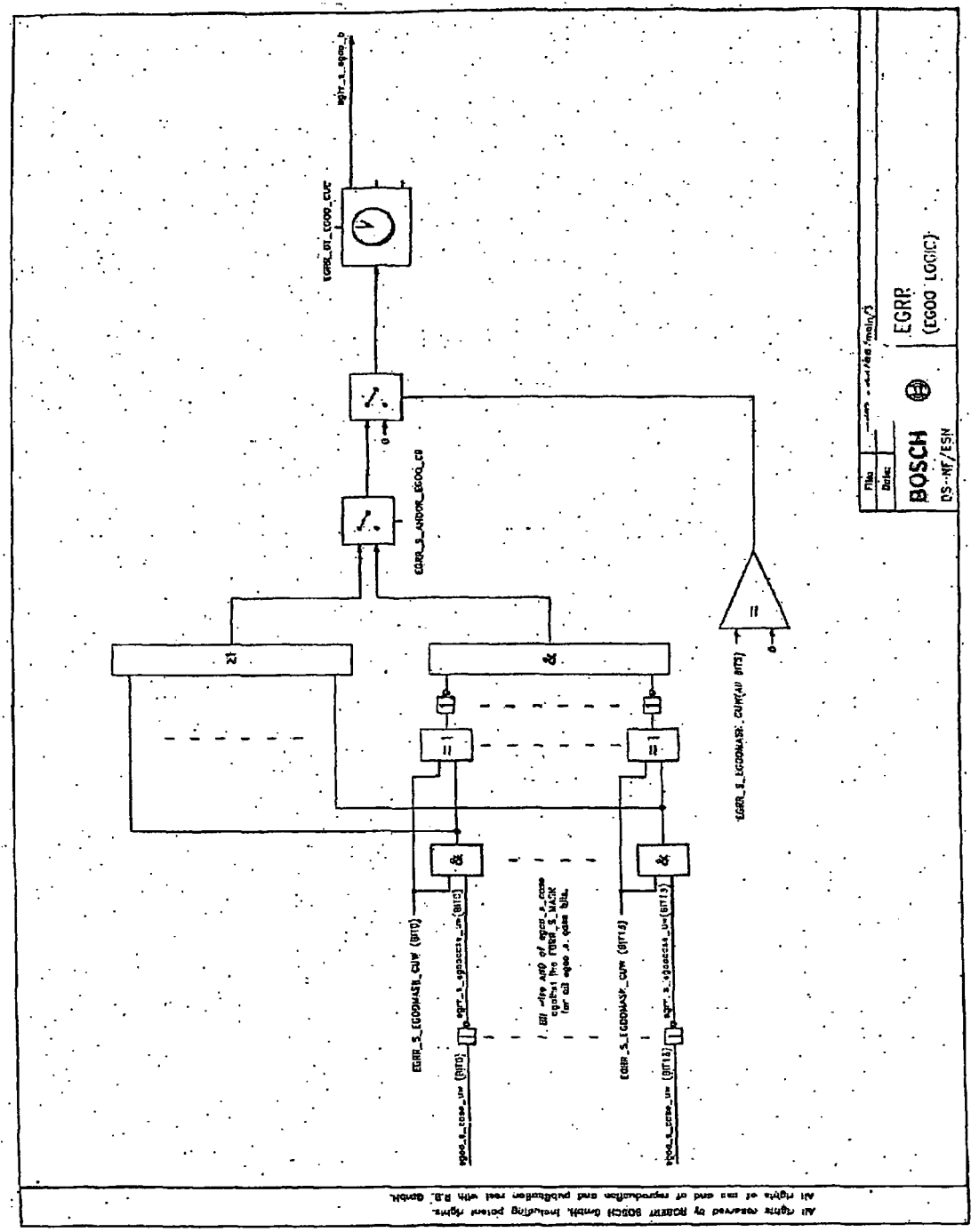

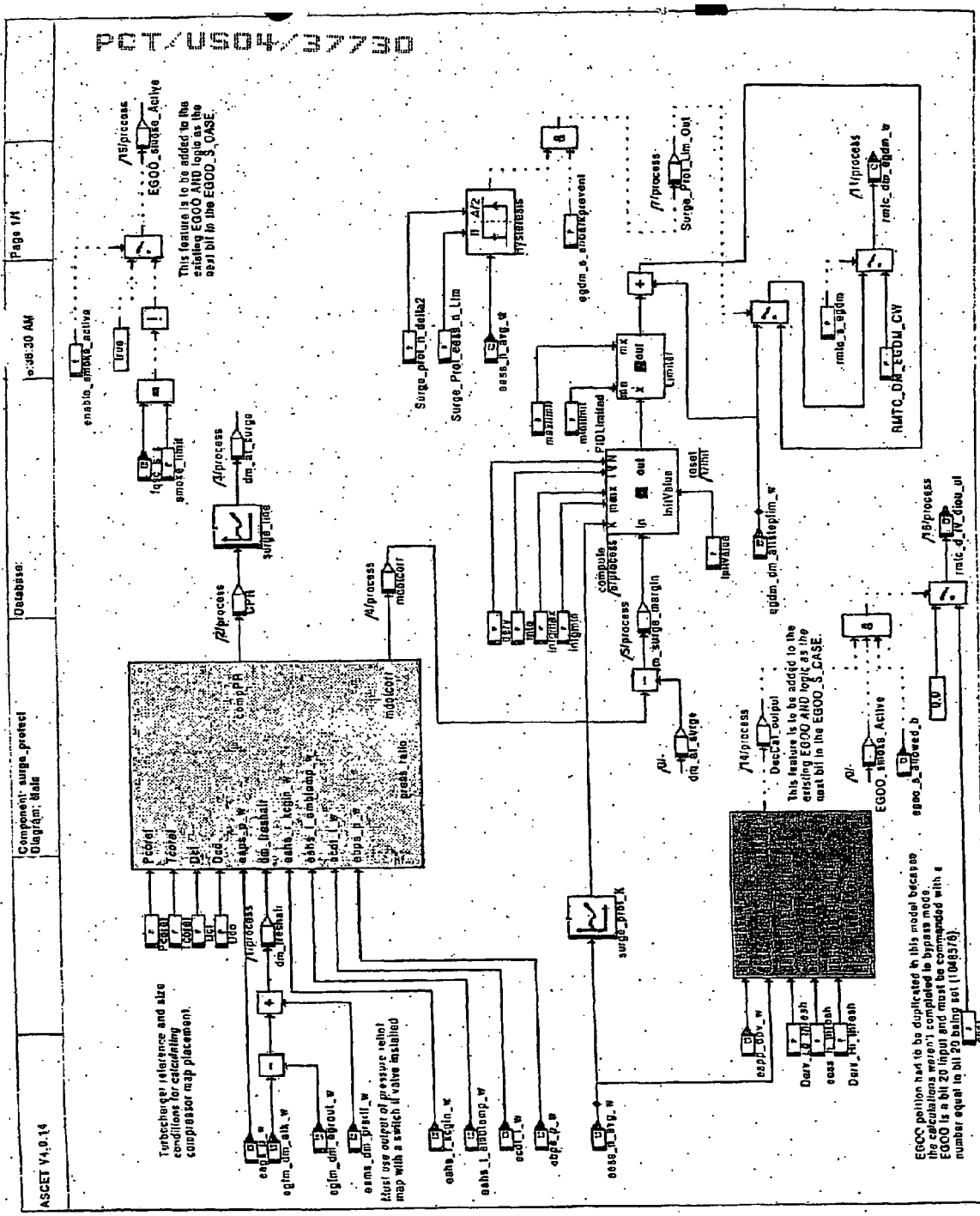

What is claimed is:

1. A method of EGR recovery comprising:
calculating a transient volume of EGR sufficient to maintain NOx emitted by an engine below a predetermined level during a period of transient operation of said engine;
supplying an actual volume of EGR during said period of transient operation;
measuring said actual level of EGR during said period of transient operation;
calculating an EGR deficit between said transient volume of EGR and said actual volume of EGR during said period of transient operation;
integrating said EGR deficit over said period of transient operation to calculate a deficit volume of EGR;
calculating a following steady-state volume of EGR sufficient to maintain NOx emitted by said engine below said predetermined level during a following period of substantially steady-state operation of said engine; and
supplying said following steady-state volume of EGR plus said deficit volume of EGR during said following period of substantially steady-state operation of said engine.

2. The method of EGR recovery of claim 1, comprising further:
calculating a leading steady-state volume of EGR sufficient to maintain NOx emitted by an engine below said predetermined level during a leading period of substantially steady-state operation of said engine;
supplying said leading steady-state volume of EGR during said leading period of substantially steady-state operation of said engine.

3. The method of EGR recovery of claim 1, comprising further:
reducing said actual volume of EGR during said period of transient operation.

4. The method of EGR recovery of claim 1, comprising further:
normalizing said EGR deficit to produce a unitless parameter.

5. The method of EGR recovery of claim 1, comprising further:
freezing said integration via a bit mask.

6. The method of EGR recovery of claim 1, comprising further:
freezing said integration at a load threshold.

7. The method of EGR recovery of claim 1, comprising further:
adjusting a duration of said following period of substantially steady-state operation of said engine.

8. The method of EGR recovery of claim 1, comprising further:
reducing said deficit volume of EGR supplied during said following period of substantially steady-state operation of said engine if an air-to-fuel ratio approaches a smoke limit air-to-fuel ratio.

9. The method of EGR recovery of claim 1, wherein said period of transient operation is selected from the group consisting of:
acceleration,
deceleration,
braking,
engine braking, and
lugging.

10. A system for EGR recovery comprising:
means for calculating a transient volume of EGR sufficient to maintain NOx emitted by an engine below a predetermined level during a period of transient operation of said engine;
means for supplying an actual volume of EGR during said period of transient operation;
means for measuring said actual level of EGR during said period of transient operation;
means for calculating an EGR deficit between said transient volume of EGR and said actual volume of EGR during said period of transient operation;
means for integrating said EGR deficit over said period of transient operation to calculate a deficit volume of EGR;
means for calculating a following steady-state volume of EGR sufficient to maintain NOx emitted by said engine of said engine below said predetermined level during a following period of substantially steady-state operation of said engine; and
means for supplying said following steady-state volume of EGR plus said deficit volume of EGR during said following period of substantially steady-state operation of said engine.

11. The system for EGR recovery of claim 10, comprising further:
means for calculating a leading steady-state volume of EGR sufficient to maintain NOx emitted by said engine below said predetermined level during a leading period of substantially steady-state operation of said engine;
means for supplying said leading steady-state volume of EGR during said leading period of substantially steady-state operation of said engine.

12. The system for EGR recovery of claim 10, comprising further:
means for reducing said actual volume of EGR during said period of transient operation.

13. The system for EGR recovery of claim 10, comprising further:
means for normalizing said EGR deficit to produce a unitless parameter.

14. The system for EGR recovery of claim 10, comprising further:
means for freezing said integration via a bit mask.

15. The system for EGR recovery of claim 10, comprising further:
means for freezing said integration at a load threshold.

16. The system for EGR recovery of claim 10, comprising further:
means for adjusting a duration of said following period of substantially steady-state operation of said engine.

17. The system for EGR recovery of claim 10, comprising further:
means for reducing said deficit volume of EGR supplied during said following period of substantially steady-state operation of said engine if an air-to-fuel ratio approaches a smoke limit air-to-fuel ratio.

* * * * *